United States Patent [19]

Cole

[11] Patent Number: 4,836,144
[45] Date of Patent: Jun. 6, 1989

[54] METHOD AND APPARATUS FOR WASHING AND TREATING ANIMALS WITH A RECIRCULATING FLUID SYSTEM

[76] Inventor: John B. Cole, P.O. Box 9354, Lago Vista, Tex. 78766

[21] Appl. No.: 904,023

[22] Filed: Sep. 5, 1986

[51] Int. Cl.⁴ ............................................. A01K 29/00
[52] U.S. Cl. ..................................................... 119/158
[58] Field of Search ..................... 119/159, 158, 103; 4/573, 572, 571

[56] References Cited

U.S. PATENT DOCUMENTS

| | | | |
|---|---|---|---|
| 693,300 | 2/1902 | Müller | 4/573 X |
| 1,401,393 | 12/1921 | Cross | 119/103 |
| 1,879,915 | 6/1929 | Smoot | 119/159 |
| 2,902,976 | 9/1959 | Wilson | 119/109 |
| 3,778,848 | 12/1973 | Lyytinen | 4/573 X |
| 4,407,234 | 10/1983 | Kleman | 119/158 |
| 4,505,229 | 3/1985 | Altissimo | 119/158 |

*Primary Examiner*—Gene Mancene
*Assistant Examiner*—R. Thomas Price

[57] ABSTRACT

An apparatus and method for washing and disinfecting domestic pets which uses a container having a recirculating pump contained therein is provided. A small volume of a liquid is initially put into the container. The container allows the liquid to drain toward the recirculating pump having a wash hose connected thereto. An animal such as a dog may be held in the container by a collar and frame assembly attached to the container. The liquid continues to be recirculated thru the wash hose until the pet has been thoroughly cleaned and disinfected.

5 Claims, 2 Drawing Sheets

METHOD AND APPARATUS FOR WASHING AND TREATING ANIMALS WITH A RECIRCULATING FLUID SYSTEM

TECHNICAL FIELD

This invention relates generally to animal treatment systems, and more particularly, to a system and method for washing and disinfecting domestic pets.

BACKGROUND ART

A common disadvantage of owing domestic animals, such as dogs and cats, is the attention and treatment required by an owner to the animal's hair and skin. For example, dogs have been susceptible to fleas, ticks and other insects for centuries. While some insects are nothing more than a nuisance to both animal and owner, some insects and the bacteria associated therewith can be life threatening to the animal and also create a health hazard to humans. Cases are documented by veterinarians each year in which ticks infest a dog to such a large degree that the dog dies from loss of blood. A common treatment used to remove harmful and annoying insects from a domestic animal's hair and skin is the regularly wash the animal with a soap and water solution and the apply any one of numerous commercially available disinfecting solutions to the animal's hair. Because pet owners typically consider the washing and disinfecting of their pets an unpleasant experience for both pet and owner, many pets do not receive proper preventive treatment for insects. As a result, veterinarians commonly treat domestic animals for insect infestation with the treatment well known as "dipping" because the animal is literaly dipped into a container of disinfectant. The immersion of an animal in liquid disinfectant is effective in removing insects which are attached to the skin of the animal or which are in an animal's hair. However, most animal react with great vigor in being so treated which makes treatment a difficult experience for the person treating the animal. Further, a large amount of disinfecting solution is typically required since the disinfectant is typically poured over the animal from a container. Because most pet ownders attempt to wash and disinfect domestic pets outdoors, proper disposal of soapy water and the disinfecting solution is also a problem. Unless a facility which is expressly designed for disinfecting animals exists indoors, most pet owners do not attempt to regularly treat pets.

BRIEF DESCRIPTION OF THE INVENTION

Accordingly, an object of the present invention is to provide an improved method for washing and treating animals with a recirculating fluid system.

Another object of the present invention is to provide an improved apparatus for washing and disinfecting domestic pets.

Yet another object of the present invention is to provide an improved apparatus for treatment of insect related hair and skin irritations associated with animals.

A further object of the present invention is to provide an improved disinfecting system for domestic pets which minimizes the amount of disinfecting solution required.

In carrying out the above and other objects of the present invention, there is provided, in one form, a device for washing an animal with a liquid solution having a container for receiving and holding a predetermined amount of the liquid solution. A holding or restraining portion is coupled to the container for holding the animal at a predetermined location in the container. A recirculation portion is coupled to the container for coupling the liquid solution to the animal when held in the container for purposes of washing the animal with the liquid solution. The liquid solution is recirculated between the container and the held animal as the solution drains off the animal and falls into the container.

These and other objects, features and advantages will be more clearly understood from the following detailed description taken in conjunction with the accompanying drawings.

DETAILED DESCRIPTION OF THE INVENTION

Figure 1:
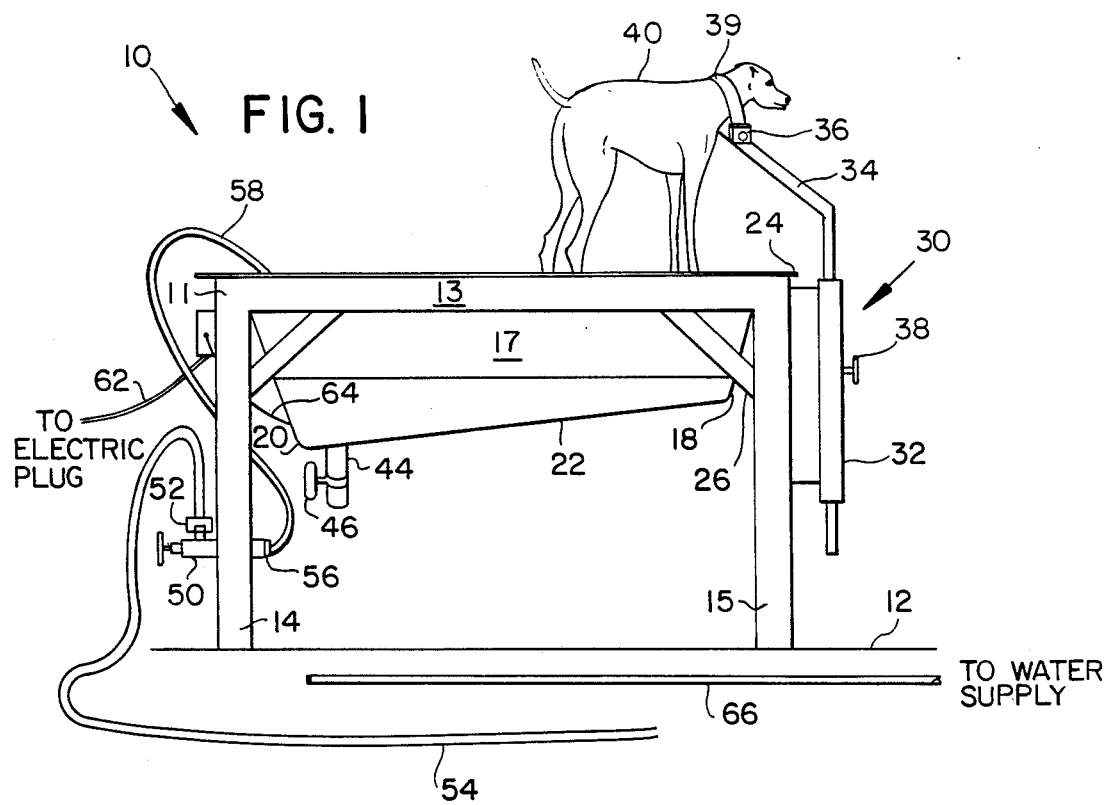
FIG. 1 illustrates a side elevational view of the apparatus in accordance with the present invention.

Shown in FIG. 1 is a side view of an apparatus 10 for washing and treating animals with liquid solutions such as water and disinfectants in accordance with the invention. A rectangular frame 11 standing on a horizontal group reference 12 is provided having a top side plate 13 and legs 14 and 15. Frame 11 supports a container 17. Container 17 has a first end 18, a second end 20, a bottom surface 22 and a top edge 24 which extends over the top side plate 13 and over both legs 14 and 15 so that frame 11 fully supports container 17. For additional support strength, a support brace may be coupled between each leg and top side plate of frame 11 such as support brace 26 is coupled between leg 15 and top side plate 13. A holding frame 30 is attached to leg 15 near the first end 18. Holding frame 30 has a hollow pipe 32 attached to leg 15 at two points of leg 15. A curved frame pipe 34 having a collar end 36 fits inside hollow pipe 32 in telescoping fashion and may be positioned so that collar end 36 has a fixed height relative to ground reference 12 by tightening a positioning screw 38 on the side of hollow pipe 32 which clamps the curved frame pipe 34 inside hollow pipe 32. Collar end 36 has an adjustable strap 39 affixed thereto which may be attached around the neck area of an animal such as a dog 40. The dog 40 when strapped into collar end 36 is confined to stand in container 17 facing toward the first end 18.

In the illustrated form, bottom surface 22 of container 17 is closer to horizontal ground reference 12 at second end 20 than at first end 18. A drain pipe 44 is connected to the bottom surface of container 17 and has a valve 46 inserted therein for controlling the draining of liquids in container 17. A valve 50 is connected to leg 14 and has a first fitting 52 connected to a hose 54. A second fitting 56 of valve 50 is connected to a first end of a hose 58 which is connected around the second end 20, over the top edge 24 and into container 17. A second end of hose 54 connects to a recirculating pump (not shown in FIG. 1) which is positioned inside and at the second end of container 17. An electric switch 60 is connected to frame 11. An input wire 62 of switch 60 is connected to an electric plug and an output wire 64 of switch 60 is connected thru the second end 20 of container 17 to the recirculating pump (not shown). A water hose 66 which may be coupled to fitting 56 of valve 50 in place of the first end of hose 58 as explained below is illustrated next to apparatus 10.

In operation, the dog 40 is positioned into container 17 and adjustable strap 39 is adjusted around the neck of the dog so that the dog can comfortably breathe and swallow but is unable to get away from the curved frame pipe 34. Initially, water may be placed in container 17 so that the dog 40 is washed thoroughly. The water may then be drained from container 17 and a disinfectant placed in container 17 so that the dog 40 is then thoroughly disinfected. To place water into container 17 from water hose 66, the illustrated end of hose 66 may be placed into container 17 from the top and filled to a desired level. Another method of placing wash water into container 17 is to connect the end of hose 66 illutrated in FIG. 1 to the second fitting 56 of valve 50 in place of hose 58. Valve 50 may be opened by an amount to obtain a desired water flow thru hose 54 which may then be placed either into container 54 for a short period of fill time or used to immediately begin rinsing the dog 40. After a desired amount of water has been poured directly into container 17 or has fallen off of the dog 40 into container 17, valve 50 may be closed and water hose 66 disconnected. Hose 58 may be reconnected to valve 50 as illustrated in FIG. 1 and when valve 50 is reopened, a recirculating liquid system is completed. The recirculating system begins with the liquid in container 17 which naturally drains toward the second end 20 due to the slope of bottom surface 22. A recirculating pump is connected to hose 58 which, when turned on by switch 60, pumps water out of the second end of container 17 thru hose 58 and valve 50 into hose 54. Hose 54 therefore constantly receives liquid being recirculated out of container 17 and may be used to continuously wash the dog 40. After the dog 40 has been sufficiently wetted and washed off, the recirculating pump may be turned off by switch 60 and the used water may be drained from container 17 by drain pipe 44 and valve 46. When valve 46 has been closed again, disinfecting solution may be either directly poured into container 17 or poured over the dog 40 and into container 17. When the recirculating pump is turned on again by switch 60, the disinfecting solution is pumped out of container 17 thru hose 54 which may be used to direct the disinfecting solution over the dog 40. As the disinfecting solution is poured over the dog 40 by hose 54, a user of apparatus 10 may massage the skin and hair of the dog 40 so that the dog 40 is thoroughly disinfected and cleaned in a processor typically referred to as "dipping". The disinfecting solution may be reused continuously with the dog 40 since the solution is constantly recirculated thru container 17. After the dog 40 has been adequately cleaned and disinfected, the recirculating pump may be turned off by switch 60 and the disinfectant allowed to drain from container 17 thru drain pipe 44. The actual physical dimensions of frame 11 and container 17 are not critical to the present invention and may vary depending upon the size of animals intended to be used in conjunction with apparatus 10.

Figure 2:
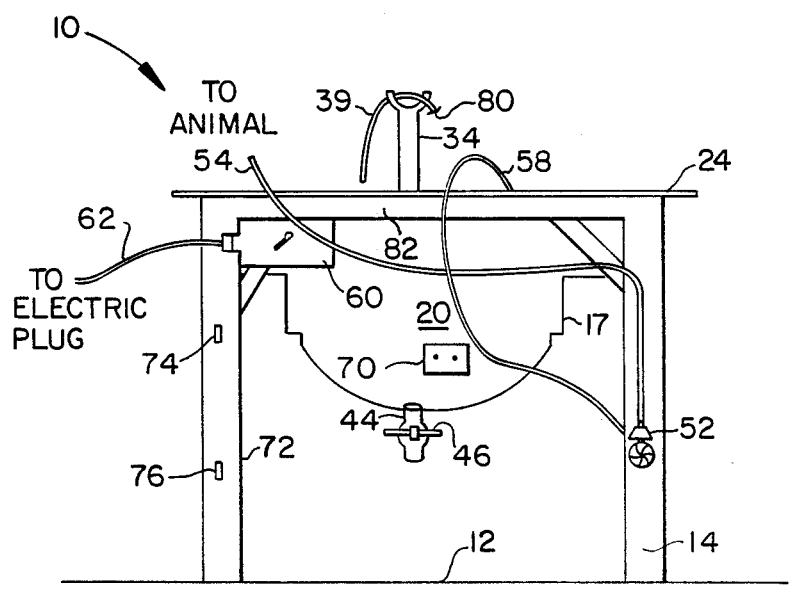
FIG. 2 illustrates an end elevational view of the apparatus in accordance with the present invention.

Shown in FIG. 2 is a side view of apparatus of FIG. 1 which further illustrates the recirculating fluid system utilized herein. Elements which are commonly illustrated in both FIG. 1 and FIG. 2 are identically numbered for purposes of explanation so that the two view may be readily correlated. The second end 20 of container 17 has a bracket plate 70 connected thereto via a coupled of mounting screws and nuts for holding hose 58 in a rigid position along the second end 20 inside container 17 as will be further illustrated below. A third leg 72 of apparatus 10 has two small hooks 74 and 76 positioned along the outer edge with hook 74 substantially vertically above hook 76. Hooks 74 and 76 may be used if so desired to allow a user to wrap electric wire 62 in circular fashion around hooks 74 and 76 thereby conveniently storing the electric wire 62 when apparatus 10 is not being used. Adjustable strap 39 has a buckle 80 on one end and has holes punched therein at variable positions along the other end. As can be readily noted, container 17 is supported by frame 11 by overlapping and extending over the upper side plates and end plates of frame 11 such as end plate 82. In the illustrated form, top edge 24 extends only slightly over the upper perimeter of frame 11.

Figure 3:
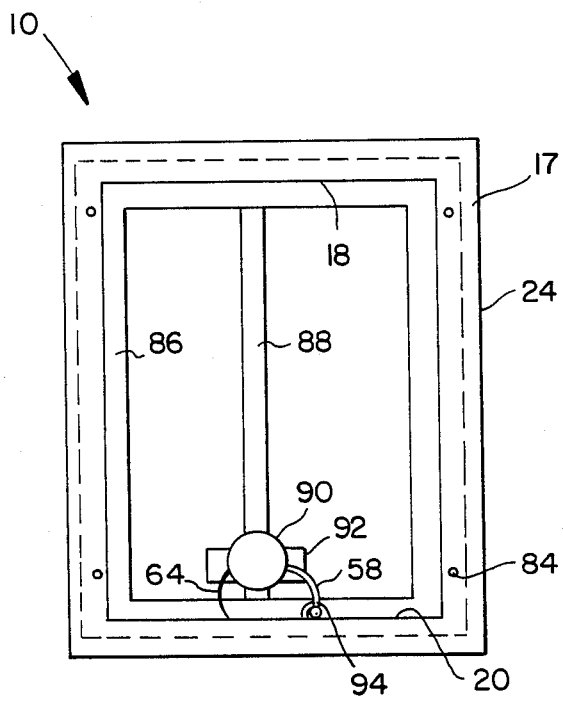
FIG. 3 illustrates a top view of the apparatus in accordance with the present invention.

Shown in FIG. 3 is a top view of apparatus 10 illustrated when a standing platform (not shown) which the dog 40 stands on when placed within container 17 has been removed from container 17. Items shown in FIGS. 1 or 2 which are again illustrated in FIG. 3 are correspondingly numbered. The top edge 24 of container 17 is shown extending over the edge on both sides and both ends of frame 11 which is illustrated by the dashed line. In the illustrated form, container 17 is rigidly affixed to frame 11 by a screw positioned near each corner such as shown by a screwhead 84. Each of RTP the screws attach container 17 and frame 11 by a conventional screw and bolt assembly (not shown). Container 17 has a rectangular inner edge 86 which is positioned from the top edge 17 about one-half the distance between the top edge 17 and the bottom surface 22. A small width trough 88 runs from first end 18 to second end 20 at the bottom surface 22. A recirculating pump 90 is positioned on a rectangular support base 92 located on the bottom surface 22. Rectangular support base 92 can be formed as part of bottom surface 22 or can be made of a material which is separate from bottom surface 22 and attached thereto. In the preferred from, bottom surface 22 is made out of plastic and support base 92 may be formed along bottom surface 22 to hold recirculating pump 90. Hose 58 is connected to recirculating pump 90 and is affixed to the end 20 by a clamp 94 which is supported by bracket plate 70 along second end 20.

Figure 4:
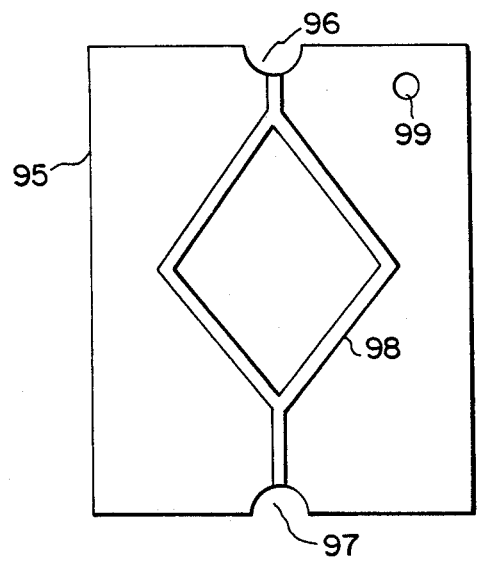
FIG. 4 illustrates a standing platform for insertion into the apparatus illustrated in FIGS. 1-3.

Shown in FIG. 4 is a rectangular standing platform 95 which fits into container 17 from the top and is supported on each side and end by rectangular inner edge 86. Platform 95 has arcuate openings 96 and 97 at either end and a slightly recessed canal 98 connecting arcuate openings 96 and 97. A circular hole 99 is placed toward one corner of standing platform 95.

In operation, standing platform 95 is placed inside container 17 and dog 40 is placed onto platform 95. I have found that most dogs will remain very calm and obedient when strapped firmly by not extremely tightly, by adjustable strap 39. For example, I have not experienced dogs which constantly fight being strapped into container 17 after being properly positioned. Should a dog attempt to fight being restrained, the dog will quickly calm down if gently pushed forward toward frame pipe 34 from the dog's hind quarters. Troublesome dogs should be secured before water is filled into container 17 and before the dog is permitted to see water flowing as a result of recirculating pump 90 being turned on. It should be apparent that the procedure explained herein pertains applicably to other domestic animals as well as to small animals requiring disinfecting such as sheep and goats.

After being properly secured in container 17 by adjustable 39 strap 39, switch 60 may be turned on to start the flow of fluid thru hoses 58 and 54 via recirculating pump 90. Initially, a solution of water and a commerical soap additive is suggested for rinsing the dog of dirt and grime. Any surface insects which may be bothering the dog are washed into container 17. Recirculating pump 90 is preferably a pump having a small intake screen which filters and blocks debris washed into container 17 from being recirculated into hose 54. Such pumps are commercially available and are small and waterproof. A fractional horsepower pump is adequate. After the dog has been sufficiently rinsed, recirculating pump 90 is turned off by switch 60 and valve 46 is opened to permit the used water solution to drain thru drain pipe 44 onto the ground. Due to the slant of bottom surface 22 of container 17, all the water quickly drains from container 17. During this time, the end of hose 54 which is used to rinse the dog 40 may be placed into the circular hole 99 so that the hose is not inadvertently draining water out of container 17. By virtue of the recessed canal 98 in platform 95, any water which might not immediately drain off the top of platform 95 into container 17 tends to flow to and thru canal 98 to one of the arcuate openings 96 or 97. Although the end direction in which platform 95 may be placed into container 17 is not important, the end adjacent circular hole 99 is typically placed adjacent the end of frame 11 which is attached to holding frame 30.

After container 17 has drained, valve 46 is closed again. A dipping solution or other commercially available disinfectant may be poured directly into container 17. Enough solution is required to submerge recirculating pump 90. Although I have found that approximately one gallon of disinfecting liquid is adequate to dip most dogs, more solution may be preferred. However, an advantage of the present invention is that the disinfecting solution is economized by the ability to continuously reuse the solution in the recirculating system. When switch 60 is turned on, the dipping solution flows from container 17, thru recirculating pump 90 into hose 58, thru valve 50 and into hose 54. Valve 50 may be adjusted to suit the user of apparatus 10 as to the rate of flow of dipping solution thru hose 54. I have found that when hose 54 is looped between the second end 20 of container 17 and hose 58 as shown in FIG. 2 that the hoses do not get entangled with each other or with the dog and a user of apparatus 10. After the dog 40 has been sufficiently scrubbed and washed with the recirculating dip solution, recirculating pump 90 may be turned off and container 17 drained again. However, before the solution is drained from container 17, dog 40 may be released and another dog dipped with the same solution if so desired. If a dog is released from adjustable strap 39 by being held firmly and picked up and placed on the adjacent ground, the dog typically does not try to shake the moisture off until finally released on the ground. Because apparatus 10 is portable and compact, a dog or other animal may be easily washed and dipped indoors during cold weather without having to own a facility otherwise designed to handle disinfecting animals.

The concept of the present invention may further include a recirculating fluid system having two or more distinct containers of solution wherein a pump is recirculating fluid between the two containers. In this way, a plurality of animals may be washed simultaneously.

By now it should be apparent that the present invention provides a method and an apparatus for washing domestic and small animals with a recirculating fluid system. The invention provides a compact, easy and economical way to wash, rinse and disinfect animals.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

I claim:

1. A device for a user to hand wash an animal with a liquid, comprising:
    container means for receiving and holding a predetermined amount of the liquid, said container means having a bottom surface which is elevated at a first end above a second end thereof with respect to a horizontal ground reference, said container means also having a porous inner surface positioned above the bottom surface and substantially parallel to the horizontal ground reference for supporting the animal;
    a vertically adjustable neck clamp attached to one of the first or second ends of the container means, for containing the animal at a predetermined location in the container means by strapping a neck area of the animal to the clamp; and
    recirculation means coupled to the container means, for moving the liquid thru a user held hose to the animal held in the container means when washing the animal, said recirculation means recirculating the liquid between the container means and the held animal, thereby using a substantially constant amount of liquid when hand washing the animal.

2. The device of claim 1 wherein the container means further comprise:
    a tub having a drain in the bottom surface near the second end for selectively draining the liquid.

3. A method for hand washing an animal with a liquid, comprising the steps of:
    receiving and holding a predetermined amount of the liquid in an open container having a bottom surface which is elevated at a first end above a second end thereof with respect to a horizontal ground reference;
    inserting a porous inner surface into the container positioned above the bottom surface and substantially parallel to the horizontal ground reference for supporting the animal;
    attaching a vertically adjustable neck clamp to one of the first or second ends of the container, for containing the animal at a predetermined location in the container by strapping a neck area of the animal to the clamp; and
    pumping the liquid in the container thru a user held hose to the animal held in the container when washing the animal and recirculating the liquid between the container and the held animal, thereby using a substantially constant amount of liquid when hand washing the animal.

4. The method of claim 3 further comprising the steps of:

using water as the liquid and recirculating the water between the animal and the container for a predetermined amount of time;

draining the water from the container; and using a disinfectant as the liquid and recirculating the disinfectant between the animal and the container for a second predetermined amount of time.

5. The method of claim 4 further comprising the step of:

draining the disinfectant from the container.

* * * * *